United States Patent [19]
Schroeder

[11] Patent Number: 5,787,186
[45] Date of Patent: Jul. 28, 1998

[54] BIOMETRIC SECURITY PROCESS FOR AUTHENTICATING IDENTITY AND CREDIT CARDS, VISAS, PASSPORTS AND FACIAL RECOGNITION

[75] Inventor: Carlos Cobian Schroeder, Madrid, Spain

[73] Assignee: I.D. Tec, S.L., Spain

[21] Appl. No.: 553,352

[22] PCT Filed: Feb. 20, 1995

[86] PCT No.: PCT/ES95/00021

§ 371 Date: Apr. 1, 1996

§ 102(e) Date: Apr. 1, 1996

[87] PCT Pub. No.: WO95/25640

PCT Pub. Date: Sep. 28, 1995

[30] Foreign Application Priority Data

| Mar. 21, 1994 | [ES] | Spain | 9400595 |
| May 26, 1994 | [ES] | Spain | 9401171 |
| Jul. 5, 1994 | [ES] | Spain | 9401452 |

[51] Int. Cl.[6] .................. G06K 9/00; G06K 5/00; B42D 15/00; G07D 7/00

[52] U.S. Cl. .................. 382/115; 382/118; 235/380; 283/70; 283/77; 340/825.34; 902/3; 902/29; 380/23

[58] Field of Search .................. 382/115–118, 162; 340/825.33, 825.34; 902/3–6, 29; 380/23–25, 54; 235/380; 283/70, 72, 74–77, 901–902, 904

[56] References Cited

U.S. PATENT DOCUMENTS

| 4,253,086 | 2/1981 | Szwarcbier | 382/126 |
| 4,972,476 | 11/1990 | Nathans | 380/23 |
| 4,975,969 | 12/1990 | Tal | 382/118 |
| 5,420,924 | 5/1995 | Berson et al. | 380/23 |
| 5,432,864 | 7/1995 | Lu et al. | 382/118 |
| 5,466,918 | 11/1995 | Ray et al. | 235/380 |
| 5,490,217 | 2/1996 | Wang et al. | 380/23 |
| 5,598,474 | 1/1997 | Johnson | 380/23 |
| 5,635,012 | 6/1997 | Belluci et al. | 235/380 |
| 5,673,320 | 9/1997 | Ray et al. | 380/23 |

FOREIGN PATENT DOCUMENTS

| 0440814 | 8/1991 | European Pat. Off. . |

*Primary Examiner*—Leo H. Boudreau
*Assistant Examiner*—Bhavesh Mehta
*Attorney, Agent, or Firm*—Klauber & Jackson

[57] ABSTRACT

A biometric security procedure for manufacturing an identity document, such as an identity card, credit card, visa or passport, which includes the steps of: providing a nucleus of the identity document, the nucleus including personal data of a holder of the identity document and a face image of the holder; carrying out, by a computer and an image capturer such as a scanner or a video camera, an analysis of face features of the face image, the computer carrying out an analysis of basic face features of the face image, comparing the basic face features with master/pattern features in a data base, wherein each master/pattern feature has a specific number; obtaining by the analysis a derived set of master/pattern features that corresponds to a characteristic synthetic image of the holder, the derived set of master/pattern features corresponding to a specific numeric code determined by the number of each of the master/pattern features making up the derived set of master/pattern features; and printing the specific numeric code by a printer connected to the computer, on an area of the identity document defined as a code window, whereby the specific numeric code univocally characterizes the holder of the identity document.

19 Claims, 2 Drawing Sheets

BIOMETRIC SECURITY PROCESS FOR AUTHENTICATING IDENTITY AND CREDIT CARDS, VISAS, PASSPORTS AND FACIAL RECOGNITION

OBJECT OF INVENTION

This invention, as described in the presentation of this descriptive report, refers to a biometric security system and authentication of identity cards, visas and passports, as well as the face identity of the holder, whose purpose is to provide these identification documents with univocal elements of identification and validation which will allow both the holder and these identity documents to be authenticated as genuine or false, if they have been fraudulently reproduced or handled, changing or replacing the identity, personal characteristics or face image.

To obtain this end a security or validation system has been designed, printing certain colored lines on the identity document in the form of a grecque or filigrees which in a coded and univocal manner represent the topology of the actual card or identity document in its most sensitive parts, so that when any attempt is made at reproducing or forging these identity documents, this fraudulent reproduction or handling is clearly and irrefutably revealed.

The security validation which is object of the invention is based on a double application in this proposal. First of all points are taken at random on the identity card or document using a parameter algorithm. The choice of these points will depend on parameters such as, for example, the birthdate of the holder, with will thus individualize the choice of these points by means of a scanner which analyses the colour of each point or its tones of grays, where these values are numerically coded and in turn assigned an equivalence to a specific colour. With this numeric or colour code which is printed on the card in the form of a grecque or filigrees of colored lines, an univocal code of the card or identity document is formed.

In addition, the formation of a data base of master/pattern features is also object of the invention, which closely applies to the authentication of the individuals and their identity documents or cards, where, by comparing the zones of the face features, a synthetic image of the individual can be obtained by adding the basic features that are taken from the data base on master/pattern features, which in turn allows a numeric code to be made and a translation into its equivalent colour code, so that, from what has been explained above, this numerical code or the colour line grecque is printed on the card or identity document as validation, completed with the additional coloured lines that code the date of birth, christian name and surname with their first initials or in full.

The invention makes it possible to use and make the two validation modalities compatible in one and the same top security identity document or card, and also the face identity of the individuals who are the holders of these identity documents.

Closely related with the authentication of individuals and their identity documents or cards, a data base of master/pattern features is formed where by comparing the areas of the face features, a synthetic image of the individual can be obtained by adding the basic features that are taken from the master/pattern features data base, which in turn allows a numeric code and translation in its equivalent colour code, and, as mentioned above, this numeric code or the grecque of coloured lines is printed on the identity document or card as validation, and this is completed with the additional coloured lines which code the date of birth, christian name and surnames with their first initials or in full.

To procure maximum security in the production of these documents, the invention foresees that the document in question embody some special covers on which all the safety validations relating to pigments will be printed directly, and also all the colour codes or filigrees, on the extrusion on their inner polyolefin or polypropylene or low density polyethylene face and in this way, likewise all the holder's personal data, face image that is obtained from the scanning and digitalization of the photo which the holder submits for each identity document, along with the print of the holder's latent face image or of the holder's synthetic or composed face image.

ANTECEDENTS OF THE INVENTION

There are a great deal of production systems and technologies for identity cards and credit cards, visas and passports, on all sorts of paper and plastic supports, and also based on photographic technique or on transfer of the holder's image by digitalized impression, using microbubble jet injection printer or thermal-sublimation or by photo-electrostatic or electro-photographic impression.

All the makers of these identity documents or of the elements which form them have placed great emphasis on the fact that the fraudulent handling of these identity documents be made more difficult, and that the defoliation or separation of the layers that form a card or document for a fraudulent or criminal alteration should cause the irreversible destruction of the whole of the identity document so that it cannot be recomposed with another identity/personality other than that of the holder for which this identity document or card was legally issued.

The market also contains a wide offer of phosphorescent and fluorescent pigments to be incorporated on the layers that form these identity documents or cards, which efficiently render any attempt at photocopying original documents that have been manipulated to obtain a different identity to that of the holder, result in a reproduction where the original colours have ostensibly changed, and in this manner the fraudulent reproduction is avoided.

However, the present state of the art of high resolution colour digitizers and scanners today allows any sort of original document to be reproduced with very high colour definition printers, which are difficult to distinguish from the original by pixel to pixel exploration and sidestepping the distortion effect of the fluorescent/phosphorescent pigments which disguise the result of the reproduction, by illuminating the original which is to be reproduced using a light that is filtered on the wave length on which this pigment is enabled.

The biometric validation methods have until now hardly been used at all in both security and as means of authenticating the card holder or identity document holder and of the actual card as genuine or forged/manipulated.

Moreover, neuronal network systems are now available on the market to identify pattern, and also fuzzy logic technologies.

The major drawback of neuronal networks to generically identify any kind of pattern, available on the market, lies fundamentally in the fact that once the pattern that are to be identified have been defined, the system is then practically closed or incapable of recognizing any other new pattern which we wish to introduce, because depending on the complexity of the new pattern, the entire system must be restructured and reorganized in what is known as a "system training process", with a great loss of time. Translating this circumstance and characteristic to a face identity use means that every time a new face of an individual must be introduced in the data base of this specific person's particular features, the other the data base of features of other specific individuals must be restructured in this "system training process". This operation may take a few minutes when this is used to identify a couple of hundred faces of individuals. When this technology has to be used for groups of hundreds of thousands of individuals or millions of faces in what can be called "population system" use, it is not practical because it takes too long to reorganize and to recognize the features.

DESCRIPTION OF THE INVENTION

The procedure of this invention has been designed for the reasons that we have explained in the above chapter, and it foresees security validations and authentication of the actual identity card or document, as well as the holder. The procedure is also biometric and can be used in the authentication of each individual who forms a community within a population census or register data process system.

To have reliable references when determining the authenticity or falseness of an identity card or an identification document, and consequently its holder, we must establish a number of significant points that are univocally chosen, that is to say, based on the card's own parameters and on the identity of its holder and procure the numeric significance of these points, depending on both the topological nature of the identity card or document and on the biometric type, in other words, depending on the face features of the holder's face image which is transferred on the card, and print the significance or equivalence of these topological or biometric points in numeric code or colour line on the card, so they form part of its information or of the identity document in an unalterable way and in an univocal relation unknown, logically, to any presumed or possible forgers of such documents.

In respect of the data base of master/pattern features, this foresees a comparison of the zones of the face features and a synthetic image or robot face image of the individual to be obtained by adding basic features taken from this data base, which in turn allows a numeric code and a translation in their equivalent colour code; this numeric code or grecque of colour lines are printed on the identity document or card as validation and are completed with the additional colour bars or lines which code the date of birth, christian name and surnames, with their first initial letters or in full.

Another characteristic novelty is to proportion the document with an additional validation which will consist of printing the latent image that is obtained from the face or photographic image of the holder, or else from the impression of the holder's latent face image where the original features have been replaced by others which are most similar to and coincide with the respective master/pattern features contained in the data base of reference master/pattern features of the data process system.

In addition, it is object of the invention to print, when applicable, the composed face image or synthetic image taken from the original photograph of the holder on these identity documents, cards, visas and passports, using the systematic analysis of features, extraction of characteristics and their parametric/anthropometric points.

BRIEF DESCRIPTION OF THE DRAWINGS

To complete the description which we are going to give below, and to help understand better the characteristics of the invention, a set of drawings is enclosed with this descriptive report, which will be used to offer an easier explanation of the innovations and advantages of the invention procedure.

DESCRIPTION OF THE PREFERRED FORM OF EXECUTION

Figure 1:
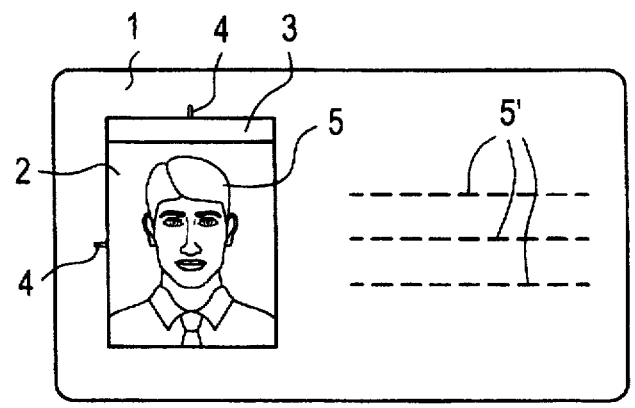
FIG. 1.—Shows a reference configuration of an identity document, credit card, visa or passport, where the face image of the holder is located, and the real or virtual window of the colour code.

Based on these figures, and specifically referring to FIG. 1, a possible optional configuration of a card 1 can be observed, identity card, credit card, visa or passport, where there are pre-printed coloured ink security filigrees, and where the face image 5 has been transferred by any procedure, whether photographic or printing by heat transfer/sublimation, or by colour printing of micro-bubble jet injection or by means of electro-photographic colour, on zone 2, of the holder of the card or identity document. In addition the personal data 5' of the holder are printed on the identity document or card. The coloured line code window 3 is determined and located anywhere on the card. By way of example, it has been chosen just above the face image 5 of the holder, also foreseeing the printing of some marks 5 or references for centering the scanner/video camera of the face image, and for selecting significant points of the card.

Once the nucleus 1 of that card has been produced, with all its elements as explained in FIG. 1, this card, and in particular the face image or photo 5, is digitalized using a scanner/video camera with CCD coloured image or line connected to a personal computer, where a prefixed and secret algorithm is fitted, which can be personalized by parametrizing for each identity card, for example, using the holder's birthdate as personalized parameter.

Figure 2:
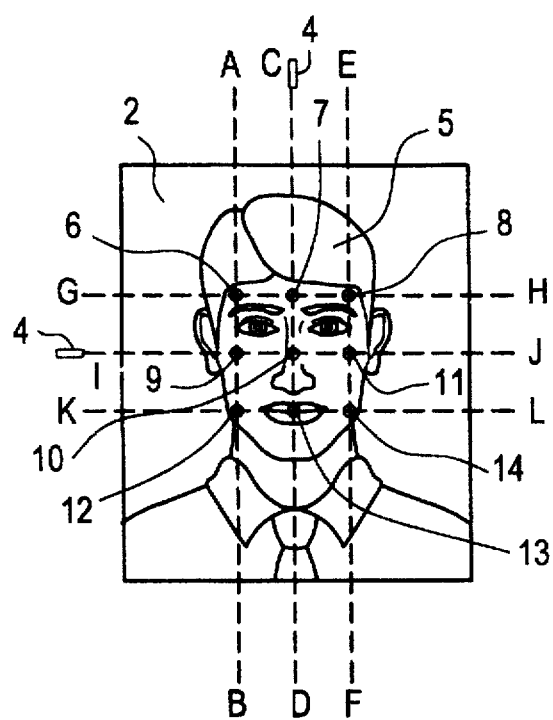
FIG. 2.—Shows a view of the possible significant points of the card which can be selected for a numerical code and their translation on coloured line, concentrating the selection of these points on the holder's photograph.

This description will describe the possibility of one of the multiple algorithms for selecting significant points of the card, with the help of FIG. 2. In this figure, the horizontal and vertical marks 4 can be observed, such that the computer, with the help of the algorithm, will virtually plot lines C–E and I–J as central reference lines and although these are located precisely in the same place for all cards, they will cross the different face images of the other cards at different zones. The computer will also plot the other lines A–B, E–F, G–H and K–L, in terms of a distance that will be calculated between given limits which can be determined in a maximum range of several millimeters and following the birthdate parameter, so that the distances between lines will be different in one identity card and another. The points of intersection that are obtained from these lines, which have been given the reference numbers 6, 7, 8, 9, 10, 22, 12, 13 and 14, will also be different in one identity card and another, with the peculiarity that other points can be chosen with the cross-section of circles and straight lines, for example.

Figure 3:
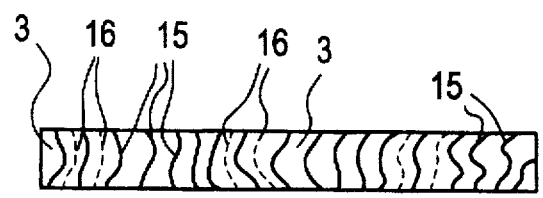
FIG. 3.—Shows the configuration of the real or virtual window of the translation on coloured line of the numerical code number arising from significant points of the card and also the master/pattern features which match the holder's face image.

Depending on the type of scanner/video camera that is used to explore and digitalize the face image of each card holder, a characteristic colour and its tones or grays and its shades can be established, with up to 256 tones in both cases, for each point that is chosen. This characteristic colour, that is attributed to each point that is chosen or scale of grays when the face image is in black/white, allows a numerical code for each point: for example, the international PANTONE colour numeration or any other that can also be applied as secret mode. This numeration of the selected points can be printed on the card, or else the equivalent colours in the form of a coloured line grecque, forming the real or virtual code window 3, printing with a printer that is connected to the personal computer as reported above, with a logical printing on card 1 in the manner that is given by way of example in FIG. 3.

The real or virtual code window 3 is printed with significant lines 15 in different colours, depending on its topological position, and each one represents the identification weight or colour or grey tone of points 6 to 14 that are selected. The window code is completed with lines whose different colours represent the christian name and surnames or initials, and also the birthdate. The filigrees or grecques of this window code are completed with neutral lines 16 which separate the significant coded lines 15.

Window code 3 whether really marked on card 1 or virtually windowed, must be of suitable dimensions to allow the scanner/video camera to have redundant information about each significant line of the grecque so it can discriminate the colours with absolute precision. The recommended dimensions are for a length of approximately 2.5 cm and a height of 2.5 to 3 mm.

The code that is contained in the grecque with lines of window 3 or the equivalent numbering that is printed on the card, is a univocal means of authentication of its face image and of the actual card, so that its holder is thus authenticated.

It is then only necessary to run the reverse process, that is to say, the code grecque of window 3 that has been explored by a scanner/video camera or directly the equivalent numerical code when this is printed on the identity card, is compared with the one that is directly obtained in the choice of significant points by the scanner/video camera that is connected to the personal computer, by means of the parametrizable algorithm, so that when the birthdate is introduced via the keyboard, this should coincide with the numeric code 100%, thus validating and authenticating the holder and its identity document or card. If this does not coincide, this means that the holder's photograph or image has been substituted or manipulated.

The biometric modality of the invention is based on the use of a system of neural networks which will identify those which are today available on the market, but which are specifically adapted as is explained below for the patent purpose.

The formation of a facial recognition system which is object of this patent, is based on a scanner/video camera of CCD line or image, black/white or colour connected to a data process work station or a very powerful personal computer which in turn is connected to a high resolution colour printer, which may be micro-bubble or ink-jet injection, heat transfer/sublimation or photoelectrostatic/ electrophotographic transfer. The generic program of identification of pattern based on fuzzy logic/neural networks is located at the personal computer/data process work station.

According to this invention then, the way that this technology is used, which is so practical and accurate in identifying generic patterns is modified, in the practical manner that is explained, with a specific end which is to reach the authentication of identity documents and cards and of the holder of each one, within a computerized population system.

Figure 4:
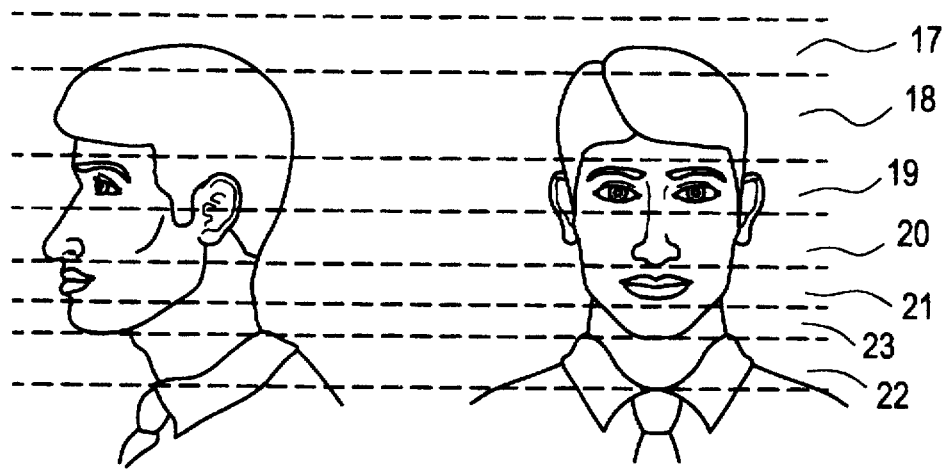
FIG. 4.—Shows a possible face segment from which to take master features which can be used as reference to form a data bank on master features, which in turn and based on this face segment would analyze each basic feature of each individual and find their equivalence in the master/pattern features base, using the data base system for face identity per computer/work station.

It can be observed from FIG. 4 that the face image of the generic individual is divided up into different face zones, where the basic and fundamental features of any face are contained relating to hair 17, or forehead 18, or eyes and eyebrows 19, nose and ear 20, mouth 21 and chin 23, and also neck 22. In addition, and in the same way as the police "composite image" systems act by classifying the faces in a generic way, according to the anthropomorphic characteristics, these zones are in turn reclassified depending on whether this is a big-boned, round, triangular face, etc.

This criterion is established and introduced in the data process system as initial basis of comparison or reference as basic features. The comparison criteria is then introduced in the neuronal fuzzy logic network with successive face models to allow the system to distinguish which generic features of the real individuals are different, so that these features, within an ample group of real faces, either taken from photographs or video-images, or live, can be considered master/pattern features.

The system which is thus formed with hundreds of thousands of faces and millions, if possible, depending on the extent of the nature of the final use which is wanted, is fed with the scanner/video camera.

The personal computer/data processing work station, with this comparison criteria exclusively takes just a 75% of the features that pertain to the segment that is established from each real face, so that no real face, at the end of the process, is contained in the data base of master/pattern features of the system.

In a lengthy process, the data process system compares these face zones exhaustively with one another and establishes which features in each zone of the face and each individual are precisely the same or very similar and which are different in the whole and which are obtained as different zone features within the entire unit that is analyzed, passing on to the master features base or reference features.

The process can be repeated with faces of groups of individuals of different races and attire and modalities, for example, with glasses of one kind or another, with beard in one form or another, with one hairstyle or another, etc., which enrich the data base of master/pattern features of the system, which can cover over a thousand dozen different types.

Each master/pattern feature in black and white or colour is given a specific number within this data base of master features, and the system which is then formed is a facial recognition system with which a number of practical uses are obtained, which form part of this invention and which are explained below.

Any individual that is issued a card or identity document or credit document has his/her face image that is contained in the card digitalized with the scanner and also, if possible, live with video camera, so that the data process system can analyze the face segment comparing the resulting feature with the master/pattern features contained in the master/pattern features data base of the system. This on the one hand obtains a synthetic face image which characterizes and identifies this individual and which is represented on the monitor of the system computer in black/white or colour, and also obtains a numeric code which univocally characterizes this individual who is the card holder or holder of the identity document.

It has been explained above that the numeric code or its equivalent in coloured line code, is printed directly on the identity document or card in the form of window 3, with real or virtual frame, forming the coloured grecque which has already been described. Printing is done by the printer which is connected to the personal computer/work station of the system or face identity.

Also, the numeric code or numbering or the coloured line grecque of code window 3, printed on the card, allows the authentication of the card and its holder. Other coloured lines have been added to the coloured line code on the grecque which code the christian name and surnames, and also the holder's birthdate.

This numeration or equivalent of coloured lines of the grecque of window 3 is thus digitalized using scanner/video camera and is compared with the code result when the computer analyses with its face identity system, the features of the photo or face image of the card with the master features that are obtained, taken from the data base on master features. When this comparison coincides completely, this shows that the card is genuine and that its face image thus authenticates the holder.

As side-product of all this process which also forms the object of this invention, there is the possibility of extending the facial recognition live, that is to say, using video camera via digitalized photography with scanner, both connected to the computer of individuals who form part of a determinate group whose factions/features have been analyzed and a numeric code of the master/pattern features which identify and characterize them has been obtained, and which is contained in a data base on population or individuals wanted by the police, etc.

In accordance with the improvements of the invention, the photograph of a face image is suitably digitalized by scanner/video camera, obtaining a virtual black/white face image with 64 to 256 grey tones. The resulting virtual image is then explored internally with the specific data process program, to detect the horizontal zone which provides the maximum frequency of information. A Sobel operator or gradient and the like is then applied on the same virtual face image that has been obtained, using a determinate threshold of grays, obtaining a direct new virtual face image with the respective contours-edges of the face and the resulting factions/features of the eyes, nose, mouth and chin, where applicable. The computer determines the center point of the eyes and measures the length and width and also the position of the eyes, nose, mouth and chin, where applicable as anthropometric parameters.

In addition, the characteristics which distinguish the face features are extracted with a specific data process program, so that the value of each pixel, in terms of the intensity of grays inside the rectangle of the selected information where the eyes, nose and mouth are described, is compared with a reference threshold, making the comparison with this data process program. The spacial composition and distribution of intensity of grays is also determined with fuzzy logic/ neural network technology, obtaining space values with respective representation of vectors.

The master/pattern features contained in the reference data base are submitted to the same process that has been mentioned above, so that from each master/pattern feature, the respective characteristic anthropometric parameters and spacial values will be obtained and the respective vectors, all of this to allow the comparison of the features taken from any photograph of treated face image, to be established with regard to eyes, nose, mouth and chin, obtaining the equivalent master/pattern features in the reference data base which offer the most coincidence or similitude in respect of the initial face image.

These master features are likewise printed on the identity card or document in question, where the numeric code or colour code is also printed which corresponds to the selected master/pattern features, and where printing is performed with the respective printer that is connected to the system computer.

The computer program of the computer identifies the corresponding angle and distances of almost 50 to 100 most significant anthropometric points, depending on the type of face image, the edge or contour of the face relating to the center point between eyes, so that with these distances and their respective angles, a complete parametric code is obtained of the face image corresponding to the face in the initial photograph, by means of 400 to 600 characters (bytes), such that these parameters which differentiate the face image are transmitted by the computer which has generated them; this transmission can be performed on conventional telecommunication lines to another computer located at the other end of the same transmission line, and this receiver computer receives these characteristic parameters base from which it faithfully reconstructs the initial face image, all based on the fact that this receiver computer has also available the same data base of master/pattern features from which it obtains the master/pattern features relating to eyes, nose and mouth, corresponding to the code that is contained in the parameters that are received.

In addition, the document in question is provided with an additional validation which consists of printing the latent image derived from the face or photographic image of the holder, or else printing this latent face image where the original features have been substituted with those which most ressemble and coincide with the respective master features contained in the data base of reference master features of the data process system.

In addition, the printing, where applicable, of the composed face image or synthetic image derived from the original photograph of the holder on these identity documents, cards, visas and passports is object of the invention, applying the systematic analysis of features, extracting characteristics anthropometric parameters and their parametric points.

Latent face image is defined as the image obtained by digital scanning of the original photograph of the holder of the identity documents, visa, passport and which is synthetically printed in various colours or, preferably in just one colour, where the objective is to highlight the identity and similarity of this latent face image with the original, on these identity documents, because this is a duplication on these documents.

The object of the invention furthermore consists a transparent polyester cover on whose inner face there is printing with reflector pigment ink and ink visible under UV light, and also the printing of a frame. On this same inner face an electric discharge is applied, followed straight away by hot deposit extrusion of a layer of low density polyethylene or polypropylene so that a fine sheet of copper or aluminium or else non-thermo-laminate plastic is applied to this surface that is formed, and this sheet will be affected by complementary windows or spaces which coincide with the printed frames on this transparent polyester cover, all prior to performing a crown electric discharge, immediately after which a hot deposit of low density polyethylene or polypropylene is performed, optionally with mixture of collagen/gelatine, to absorb water soluble ink.

The sheet of copper, aluminium or plastic is then removed, and an impression of ink, grecques, coloured filigrees, personal circumstances and also face image, latent face image and/or composed face image or derived synthetic face image is made on the last surface and directly.

In addition, on this same surface and by way of an option, also in a specular manner, these face images colour filigrees, etc., are printed, with either electrophotographic printing or else photoelectrostatic printing, and even by conventional printing.

As for the document in question, the nucleus of it will be formed on white paper or else white polyester or any other sort of white plastic or white printing and by way of an option it will include continuous printing lines, with the peculiarity that an electric crown discharge is applied on both sides, followed immediately by hot extrusion of low density polyethylene or polypropylene, with complete hot thermo-lamination with the personalized covers as defined above.

I claim:

1. A biometric security procedure for manufacturing an identity document selected from the group comprising identity cards, credit cards, visas and pass-ports, comprising the steps of:

providing a nucleus of the identity document, said nucleus comprising personal data of a holder of the identity document and a face image of the holder;

carrying out, by means of a computer connected to an image capturing means comprising one of a scanner and a video camera, an analysis of face features of said face image, the computer carrying out an analysis of basic face features of said face image, comparing the basic face features with master/pattern features comprised in a data base, each master/pattern feature having a specific number;

obtaining by said analysis a derived set of master/pattern features that corresponds to a characteristic synthetic image of the holder, said derived set of master/pattern features corresponding to a specific numeric code determined by the number of each of the master/pattern features making up said derived set of master/pattern features;

printing said specific numeric code by means of a printer connected to the computer, on an area of the identity document defined as a code window, whereby said specific numeric code univocally characterizes the holder of the identity document.

2. The procedure according to claim 1, further comprising the step of displaying the derived set of master/pattern features on a screen of the computer.

3. The procedure according to claim 1, wherein the nucleus of the identify document is provided with color lines in the form of filigrees.

4. The procedure according to claim 1, wherein the name and birthdate of the holder are coded by a color code which is printed on the code window.

5. The procedure according to claim 1, wherein a digitalized image of the holder is printed on the identity document.

6. The procedure according to claim 1, further comprising printing on the identity document one of the synthetic image of the holder and a digitalized image of the holder having one or more face features replaced by one or more of the derived master/pattern features.

7. The procedure according to any of claims 1 or 2–6, further comprising the following steps:

digitalizing the face image by one of the scanner and the video camera;

obtaining a black/white face image with 64 to 256 tones of gray;

performing an exploration of face zones of said black/white face image using an image processing computer program to detect a horizontal zone which gives a maximum frequency of information corresponding to the eye region, where the position of a center point between the rectangular frames of each eye is obtained as a central reference point;

applying a gradient operator or edge extraction on a virtual face image which is thus obtained, by means of a determined threshold of grays, whereby a resulting face image is obtained where a contour edge of the face and resulting factions/feature of eyes, noise and mouth is represented and where a background the hair has been filtered and homogenized; and measuring, on said virtual face image, the length, width and position of the eyes, nose and mouth.

8. The procedure according to claim 7, wherein the image processing computer program extracts characteristics which distinguish the face features, extracting the most marked edges, comparing a value of each pixel with a reference threshold in respect of an intensity of gray within an information rectangle selected where the eyes, nose, mouth and chin, if applicable, are defined, or else using fuzzy logic/neuronal network technology; wherein spatial composition and distribution of intensity of grays is determined within the rectangles which frame the eyes, nose and mouth, obtaining space values with respective representation of intensity vectors.

9. The procedure according to claim 8, wherein the master/pattern features are analyzed, where for each master/pattern feature, with a master size, their respective characteristics space values are obtained and the respective anthropoinetric parametric vectors, so that for any face image photograph which is processed in this way, a comparison will be established of its features taken in the form of anthropometric parameters relating to eyes, nose, mouth and chin, as the case may be, obtaining their equivalent master features in the data base on reference features whose most coincident and similar anthropometric parameters are shown in respect of initial face image and where these master features are printed on the identity card, credit card, visa or passport, by the printer which is connected to the computer, and also the numeric code or color code corresponding to the selected master features.

10. The procedure according to claim 9, wherein the computer at all times reconstructs and reproduces the face image obtained, wherein 50 to 100 most significant points of the contour edge of the face and anthropometric parameters are prefixed beforehand, measuring the distance and corresponding angle with the data process program, from the mid-center point of the eyes, obtaining a parametric code of the face image, corresponding to the face initial photograph, by approximately 400 to 600 characters (Bytes), wherein these parameters are generated and transmitted the computer over a transmission line via a modem, such that a receiver computer which is located at the other end of the transmission line is capable of receiving the characteristic parameters and reconstructing therefrom the initial face image, and wherein the receiver computer accesses the data base of master/pattern features to obtain the master features relating to eyes, nose, mouth and chin, if applicable, corresponding to the code contained in the parameters that have been received.

11. The procedure according to claim 1 further comprising authenticating the identity document by the following steps:

digitizing the code window via the scanner and the computer and determining the specific numeric code printed on the code window; and representing on a screen of the computer a displayed synthetic face image derived from said master/pattern features.

12. The procedure according to claim 11, wherein the name and the birthdate of the holder is printed on the identity document, and further comprising the step of decoding the name and the birthdate.

13. The procedure according to claim 11, wherein the specific numeric code is printed in the form of numbers.

14. The procedure according to claim 11, wherein the numeric code is printed as a color code.

15. The procedure according to claim 1 further comprising authenticating the identity document by the following steps:

digitizing and reading the specific numeric code printed on the document by one of the scanner and the camera; reading the face image of the holder and determining a corresponding set of master/pattern features, and determining a corresponding numeric code derived from said corresponding set; and comparing the corresponding numeric code with the specific numeric code printed on the identity document, whereby full coincidence between both codes is interpreted as a proof of authenticity of the document.

16. The procedure according to claim 1, wherein the specific numeric code is printed directly on the identity document in the form of numbers.

17. The procedure according to claim 1, wherein the specific numeric code is first translated to a color code, which is then printed on the identity document.

18. The procedure according to claim 1, wherein the specific numeric code is printed by a color printer connected to the computer, by means of one of a thermal transfer/sublimination technology, a colour ink injection technology, an electro-photography technology and a digital photography technology.

19. The procedure according to claim 1 further comprising analyzing the face image by means of the computer, wherein the computer carries out the steps of digitizing the face image, determining a position of a center print between the eyes, and determining anthropomethric paramenters relating to the length, width and position of the eyes, nose and mouth.

* * * * *